(12) United States Patent
Campman et al.

(10) Patent No.: US 7,632,913 B2
(45) Date of Patent: Dec. 15, 2009

(54) METHOD OF PRODUCING POLYCARBONATE IN A FLASH DEVOLATILIZATION SYSTEM

(75) Inventors: Maarten Antoon Jan Campman, Churra-Murcia (ES); Jan-Willem Goedmakers, Putte (NL); Jürg Keller, Winkel (CH); Peter Willi Kreis, Winterthur (CH)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 159 days.

(21) Appl. No.: 11/863,723

(22) Filed: Sep. 28, 2007

(65) Prior Publication Data
US 2009/0088538 A1    Apr. 2, 2009

(51) Int. Cl.
*C08G 6/00*   (2006.01)
*C08G 63/02*  (2006.01)

(52) U.S. Cl. .................. 528/196; 422/134; 526/65; 528/198

(58) Field of Classification Search .................. 422/134; 526/65; 528/196, 198
See application file for complete search history.

(56) References Cited

U.S. PATENT DOCUMENTS

| | | |
|---|---|---|
| 3,834,441 A | 9/1974 | Vernaleken et al |
| 4,323,668 A | 4/1982 | Brunelle |
| 5,091,591 A | 2/1992 | Cipullo |
| 5,151,491 A | 9/1992 | Sakashita et al. |
| 5,276,129 A | 1/1994 | Sakashita et al. |
| 5,525,701 A | 6/1996 | Tominari et al. |
| 5,696,222 A | 12/1997 | Kaneko et al. |
| 6,177,536 B1 | 1/2001 | Anamizu et al. |
| 6,252,036 B1 | 6/2001 | Hatono et al. |
| 6,300,459 B1 | 10/2001 | Kaneko et al. |
| 6,303,734 B1 | 10/2001 | Funakoshi et al. |
| 6,399,739 B1 | 6/2002 | McCloskey et al. |
| 6,403,754 B1 | 6/2002 | McCloskey et al. |
| 6,410,777 B1 | 6/2002 | Kaneko et al. |
| 6,417,291 B1 | 7/2002 | Kaneko et al. |
| 6,420,512 B1 | 7/2002 | McCloskey et al. |
| 6,420,588 B1 | 7/2002 | McCloskey et al. |
| 6,469,192 B1 | 10/2002 | Burnell et al. |
| 6,500,914 B1 | 12/2002 | Brack et al. |
| 6,506,871 B1 | 1/2003 | Silvi et al. |
| 6,518,391 B1 | 2/2003 | McCloskey et al. |
| 6,525,163 B1 | 2/2003 | Brack et al. |
| 6,548,623 B2 | 4/2003 | Brunelle et al. |
| 6,590,068 B2 | 7/2003 | Brack et al. |
| 6,600,004 B1 | 7/2003 | McCloskey et al. |
| 6,653,434 B2 | 11/2003 | Brack et al. |
| 6,706,846 B2 | 3/2004 | Brack et al. |
| 6,710,156 B2 | 3/2004 | Whitney et al. |
| 6,723,823 B2 | 4/2004 | McCloskey et al. |
| 6,734,277 B2 | 5/2004 | Brack et al. |
| 6,747,119 B2 | 6/2004 | Brack et al. |
| 2002/0132957 A1 | 9/2002 | Brack et al. |
| 2003/0120023 A1 | 6/2003 | Matsumoto et al. |
| 2004/0068086 A1 | 4/2004 | Day et al. |
| 2004/0087756 A1 | 5/2004 | Ramesh et al. |
| 2005/0234211 A1 | 10/2005 | Martinez et al. |
| 2006/0069228 A1 | 3/2006 | McCloskey et al. |
| 2007/0135611 A1 | 6/2007 | Brack et al. |
| 2009/0088540 A1 | 4/2009 | Brack et al. |

FOREIGN PATENT DOCUMENTS

| | | |
|---|---|---|
| EP | 0738743 A1 | 10/1996 |
| JP | 5009282 A2 | 1/1993 |
| JP | 10101786 A2 | 4/1998 |
| JP | 10101787 A2 | 4/1998 |
| JP | 11302228 A2 | 11/1999 |
| JP | 2000129112 A | 5/2000 |
| JP | 2002309015 A2 | 10/2002 |
| WO | 03040208 A1 | 5/2003 |
| WO | 03106149 A1 | 12/2003 |

*Primary Examiner*—Terressa M Boykin
(74) *Attorney, Agent, or Firm*—Larson & Anderson, LLC

(57) ABSTRACT

The present invention provides a reactor system for producing polycarbonate. The reactor system has one or more reactant vessels, an oligomerization reactor, a first pressure control device, a preheater, a second pressure control device, a distributor, and a flash tank. The one or more reactant vessels contain reactants contain a melt transesterification catalyst, a dihydroxy compound, and an activated diaryl carbonate. The reactor system is connected in the following configuration: (i) the one or more reactant vessels connected to the oligomerization reactor, (ii) the first pressure control device disposed between and connecting the outlet of the oligomerization reactor and the inlet of the preheater; (iii) the second pressure control device disposed between and connecting the outlet of the preheater and the distributor; and (iv) the distributor disposed at the inlet to the flash tank. The pressure in the preheater is controllable at a pressure intermediate between the pressure in the oligomerization reactor and the flash tank.

17 Claims, 11 Drawing Sheets

Figure 5: Residual MS and Mw as a function of devol pressure. Rate = 10 kg/h, T devol = 240°C Figure 6: X-rite pellet Color as a function of Devol temperature. Rate is 10 kg/h, P devol = 50 mbar Figure 7: Byproduct concentrations as a function of devol pressure. F=10 kg/h, T=240 °C Figure 8: Sal-OH formation as a function of %MS at F=20 kg/h BPA ("uncapped"/free OH)

TMSC

Sal-OH

ISC (IMSC)

(R=CH3) Methyl Carbonate (R=CH3) Methyl Ether

METHOD OF PRODUCING POLYCARBONATE IN A FLASH DEVOLATILIZATION SYSTEM

BACKGROUND OF THE INVENTION

Polycarbonate is a thermoplastic that has excellent mechanical properties such as impact resistance, heat resistance and transparency. Polycarbonate is widely used in many engineering applications.

Polycarbonates may be prepared by several processes (U.S. Pat. No. 6,177,536) including: i) Interfacial, wherein a multiphase reaction process a dihydroxy aromatic compound is first reacted with phosgene in the presence of a small amount of monohydroxy aromatic compound and then precipitated and dried to yield a polycarbonate powder; ii) A melt process in which phosgene is reacted with a monohydroxy aromatic compound in the presence of an alkaline catalyst to yield a carbonic diester that is polymerized in a multistage reactor in the presence of a dihydroxy aromatic compound to yield a molten polycarbonate; iii) A melt process in which a non phosgene route is used to obtain a carbonic diester that is polymerized in a multistage reactor in the presence of a dihydroxy aromatic compound to yield a molten polycarbonate (U.S. Pat. No. 5,525,701); and iv) A melt process in which a phosgene route is used to obtain an ester substituted diaryl carbonate that is polymerized in a multistage reactor in the presence of a dihydroxy aromatic compound to yield a molten polycarbonate (U.S. Pat. No. 4,323,668).

U.S. Pat. No. 4,323,668 describes a reaction between BPA and BMSC to produce BPA homopolymer polymers. The patent states that use of (ortho-alkoxycarbonylaryl) carbonate substrates provides, when contrasted with bis(ortho-haloaryl) carbonates, the following advantages: (1) improved transesterification reaction rate, (2) less polycarbonate color formation during the transesterification reaction, (3) milder transesterification reaction conditions including lower temperatures, (4) reduced amounts of carbonate substrate since only stoichiometric amounts or amounts slightly in excess are required for complete conversion of all dihydric phenol to polycarbonate, and (5) reduced or equivalent quantities of catalyst at improved reaction rate, temperature and pressure transesterification reaction conditions.

SUMMARY OF THE INVENTION

The present invention provides a method of producing polycarbonate as well as a reactor system for preparing polycarbonate. In a first embodiment, the present invention provides a reactor system for producing polycarbonate. The reactor system comprises one or more reactant vessels, an oligomerization reactor, a first pressure control device, a preheater, a second pressure control device, a distributor, and a flash tank. The one or more reactant vessels contain reactants comprising a melt transesterification catalyst, a dihydroxy compound, and an activated diaryl carbonate. The reactor system is connected in the following configuration:

(i) the one or more reactant vessels connected to the oligomerization reactor,
  (ii) the first pressure control device disposed between and connecting the outlet of the oligomerization reactor and the inlet of the preheater,
  (iii) the second pressure control device disposed between and connecting the outlet of the preheater and the distributor,
  (iv) the distributor disposed at the inlet to the flash tank, whereby the pressure in the preheater is controllable at a pressure intermediate between the pressure in the oligomerization reactor and the flash tank.

In a second embodiment the present invention provides a method of producing polycarbonate. The method comprises the steps of:

(a) providing a reactor system comprising: an oligomerization reactor, a first pressure control device, a preheater, a second pressure control device, a distributor, and a flash tank, wherein the reactor system is connected in the following configuration:
  (i) the first pressure control device disposed between and connecting the outlet of the oligomerization reactor and the inlet of the preheater,
  (ii) the second pressure control device disposed between and connecting the outlet of the preheater and the distributor,
  (iii) the distributor disposed at the inlet to the flash tank,
(b) introducing reactants to the oligomerization reactor operating under melt polymerization conditions, the reactants comprising a melt transesterification catalyst, a dihydroxy compound, and an activated diaryl carbonate,
(c) allowing the reactants to react in the oligomerization reactor to form a polycarbonate oligomer mixture comprising a polycarbonate oligomer, a byproduct phenolic compound, and unreacted reactants,
(d) introducing the polycarbonate oligomer mixture to the preheater through the first pressure control device,
(e) heating the polycarbonate oligomer mixture in the preheater thereby creating a heated polycarbonate oligomer mixture,
(f) introducing the heated polycarbonate oligomer mixture to the flash tank through the second pressure control device to the distributor and then to the flash tank, and
(g) separating and removing byproduct phenolic compound and product polycarbonate from the flash tank, wherein the first and second pressure control devices are operated to maintain a pressure in the preheater such that the polycarbonate oligomer mixture in the preheater is present in a two-phase liquid-gas state, thereby preparing polycarbonate.

DETAILED DESCRIPTION OF THE INVENTION

Figure 1:
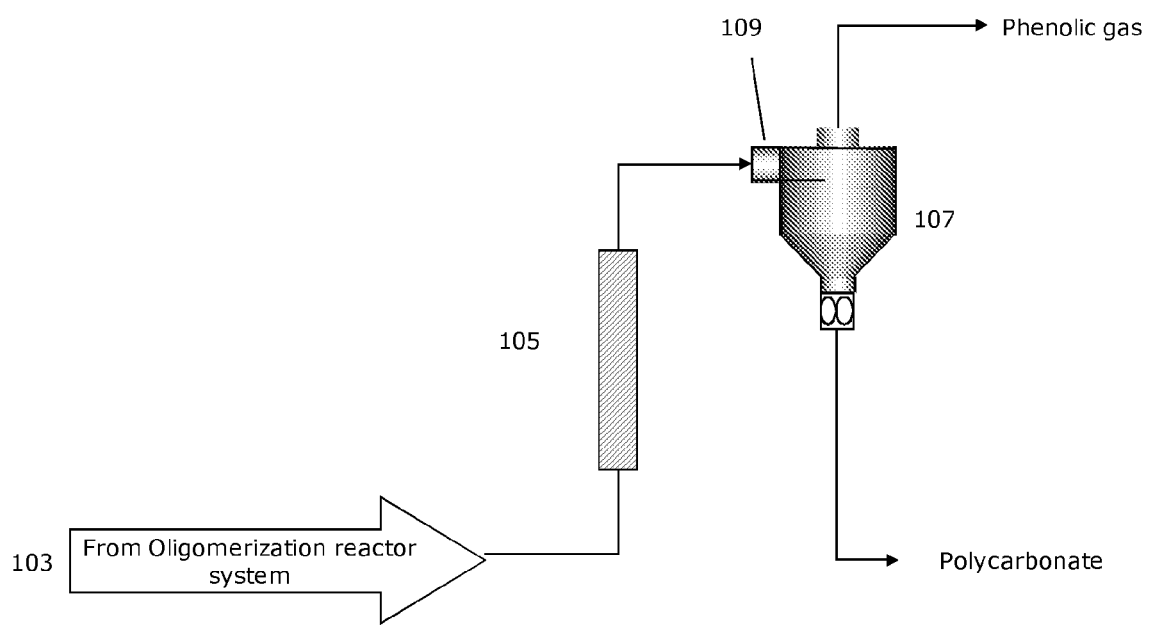
FIG. 1 is a schematic view of a reactor system for producing polycarbonate.

The present invention may be understood more readily by reference to the following detailed description of preferred embodiments of the invention and the examples included herein. The present invention relates to a reactor system for and a method of producing polycarbonate by melt transesterification reactions. It has herein been found that by using the reactor system of the present invention that the reactants may be treated at lower temperatures thereby enabling one to prepare polycarbonates having superior color among other improved properties.

Definitions

As used in the specification and claims of this application, the following definitions, should be applied:

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one dihydroxy compound joined by carbonate linkages. In certain embodiments of the invention, the polycarbonate comprises residues of an aromatic dihydroxy compound and has a number average molecular weight, Mn measured by GPC relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

"polycarbonate oligomer mixture" as it is used herein to describe the reaction mixture within the reactor components including the oligomerization reactor is herein understood to mean that at least partial reaction has occurred to produce polycarbonate oligomer having at least from 2 to 40 repeat units derived from dihydroxy compound(s). The polycarbonate oligomer mixture comprises a polycarbonate oligomer, a byproduct phenolic compound, and unreacted reactants from the initial reactants.

The terms "one-phase" and "liquid state" as they are used in certain embodiments to characterize the reaction mixture in the oligomerization reactor are understood to mean that the reaction mixture in the oligomerization reactor is substantially in the liquid phase. However, the reaction mixture may have a gas component of no more than 5 volume % gas, for example less than 3 volume % gas, and preferably less than 1 volume % gas, for example less than 0.5 volume % gas.

The terms "two-phase" and "gas-liquid state" as they are used herein to characterize the reaction mixture in the preheater are understood to mean that the reaction mixture in the preheater has both a gas component and a liquid component. The gas component will make up greater than 5 volume % of the reaction mixture in the preheater. In more preferred embodiments, the gas component will make up greater than 10 volume %, more preferably greater than 15 volume %, and most preferably greater than 20 volume % of the reaction mixture in the preheater.

The phrase "wherein the first and second pressure control devices are operated" as it is used herein to describe the pressure in the preheater is understood to mean that the first and second pressure control devices are operating under conditions sufficient to allow the polycarbonate oligomer mixture in the preheater to be present in a two-phase liquid-gas state. The first and second pressure control devices may independently or together be set to control the pressure in the preheater. For example the first pressure control device may be set to maintain the pressure in the oligomerization vessel to its desired pressure while the second pressure control device may be set and/or adjusted to allow the pressure in the preheater to be at a lower pressure.

"Dihydroxy compound(s)" include both aromatic and non-aromatic dihydroxy compounds.

"BPA" is herein defined as bisphenol A or 2,2-bis(4-hydroxyphenyl)propane.

As shown in FIG. 1, a reactor system for preparing polycarbonate comprises an oligomerization reactor 103, a preheater 105, and a flash tank 107. A mixture of reactants including a dihydroxy compound, a carbonate source, and melt transesterification catalyst are introduced to the oligomerization reactor 103 operating under melt polymerization conditions. The reactants react in the oligomerization reactor 103 to produce polycarbonate and a phenolic byproduct. To finish the polymerization process and to produce a product polycarbonate stream, the phenolic byproduct is removed from the reaction mixture. The mixture is sent from the oligomerization reactor 103 to the preheater 105 where the mixture is heated under pressure and subsequently introduced to the flash tank 107, here through a distributor 109. The phenolic byproduct is separated from the mixture leaving a product polycarbonate that is removed from the flash tank 107.

In order to remove the polycarbonate from the flash tank 107 it is necessary to maintain a high temperature and hence a low viscosity of the polycarbonate within the flash tank 107 such that the product polycarbonate does not solidify therein. To this end the liquid reaction mixture is heated to a high temperature and under high pressure (e.g. a superheated mixture) in the preheater 105 to withstand the adiabatic expansion cooling once it is flashed into the flash tank 107 through the distributer 109.

Treating the reaction mixture at a high temperature is disadvantageous to the final properties of the product polycarbonate. It is believed that when treating the reaction mixture under high temperature, the phenolic byproduct undergoes side reactions with the polycarbonate chain leading to a reduction in product polycarbonate properties including color. The side reactions of the phenolic byproducts with the polycarbonate chain produce undesired formations in the polycarbonate. These formations can be viewed in FIGS. 10B-10F and include, inter alia, salicyl-OH (SalOH), terminal methyl salicyl carbonate (TMSC), internal salicyl carbonate (ISC, a.k.a. IMSC), methyl carbonate (Me-Carb), and methyl ether (Me-Ether).

Figure 2:
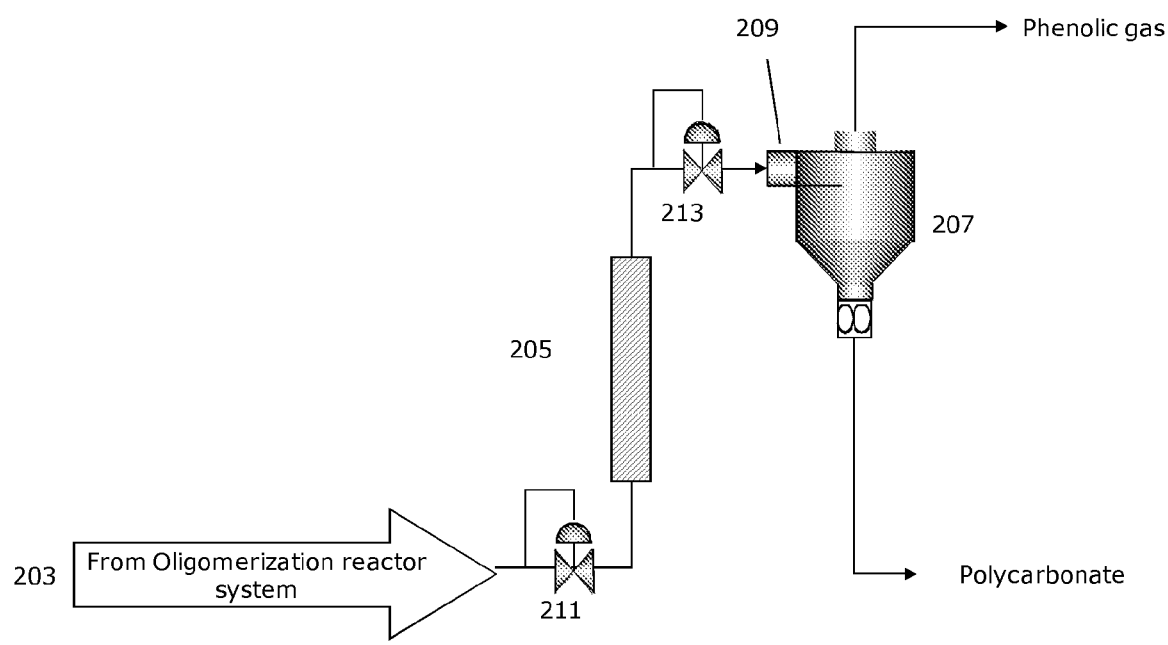
FIG. 2 is a schematic view of the reactor system of the present invention.

As illustrated in FIG. 2, the present invention provides, inter alia, a reactor system that allows for the reaction mixture to be heated at a low temperature in the preheater 205 while ensuring a processable and flowable product polycarbonate stream from the flash tank 207. By treating the reaction mixture at a low temperature the undesired side reactions described above are reduced. Introducing the pressure control devices between (1) the oligomerization reactor 203 and the preheater 205, and (2) the preheater 205 and the flash tank 207 allows the pressure of the reaction mixture in each system component to be independently controlled while achieving separation of the phenolic byproduct at lower temperatures. To this end the pressure of the preheater 205 is maintained such that the reaction mixture in the preheater 205 is a two phase liquid/gas mixture. In a preferred embodiment the pressure of the oligomerization reactor 203 is maintained such that the reaction mixture in the oligomerization reactor 203 is a single liquid phase mixture. For example, the oligomerization reactor is a plug flow reactor and the first pressure control device is operated to maintain a pressure in the plug flow reactor such that the reaction mixture in the oligomerization reactor is in a one-phase liquid state.

Allowing a two-phase liquid-gas system in the preheater 205 results in at least three distinct advantages. First, because the two-phase system is present in the preheater 205 at a lower pressure than the oligomerization reactor, the energy required to be imparted to the reaction mixture in the preheater 205 occurs at a low temperature. This minimizes energy requirements for the overall reaction scheme. Second, because the reaction mixture is treated at a low temperature in the preheater 205, the undesired side reactions between the phenolic byproduct and the polymer chain can be minimized thereby creating a polycarbonate with superior properties including color. Third, because the phenolic residue that needs to be removed is already partially in the gaseous state, less expansion evaporation needs to occur thereby lowering the resultant adiabatic temperature drop, allowing a low entry temperature to the flash tank to achieve a flowable polycarbonate stream from the flash tank.

The means to achieve isolation of pressures of the reaction mixture in the components of the reaction system is not particularly limited. In one embodiment the pressures of the reaction mixture are isolated by the use of a first and second pressure control devices. The first pressure control device is disposed between the oligomerization reactor and the preheater and the second pressure control device is disposed between the preheater and the distributor of the flash tank. The first and second pressure control devices may be any pressure control device suitable for maintaining the pressure in the reactor components per the requirements described herein. For example, the first and/or second pressure control devices may be any of a back pressure control valve, an orifice, a pipe, or some other element disposed between the oligomerization reactor and the preheater, and the preheater and the flash tank, that are operated to maintain the pressure of the preheater intermediate to the pressures of the oligomerization reactor and the flash tank and to allow a two phase reaction mixture in the preheater.

In a preferred embodiment as depicted in FIG. 2 the isolation of the pressure of the reaction mixture between system components is accomplished by the use of a first back pressure control valve 211 located between the oligomerization reactor 203 and the preheater 205 and a second back pressure control valve 213 located between the preheater 205 and the distributor 209 of the flash tank 207. In this preferred embodiment the first back pressure control valve 211 serves to maintain the upstream pressure of the reaction mixture in the oligomerization reactor 203 such that the reaction mixture is in a single liquid phase while maintaining a pressure in the preheater 205 such that the reaction mixture in the preheater 205 is in a two liquid/gas phase.

The type of oligomerization reactor is not particularly limited. For example the oligomerization reactor may be any vessel suitable to maintain the reaction mixture under melt polymerization conditions and the other conditions specified herein. As non-limiting examples, the oligomerization reactor may be a plug flow reactor, a continuously stirred tank reactor, or an extruder. However, a plug flow reactor has herein been found to be preferred. In one embodiment the oligomerization reactor 203 is operated at a temperature between 170 and 230° C., more preferably between 180 and 220° C. The first back pressure control device 211 is operated to maintain a pressure in the oligomerization reactor at a pressure of between 2 and 5 bars, more preferably between 2.5 and 4.5 bars, and most preferably between 3 and 4 bars.

The second back pressure control valve 213 serves to maintain the pressure of the reaction mixture in the preheater 205, at a lower pressure than the oligomerization reactor 203 and a higher pressure than the vacuum operated flash tank 207, such that the reaction mixture is a two phase liquid/gas system. In a preferred embodiment the preheater is operated at a temperature of between 230 and 260° C. and more preferably between 230 and 250° C. Preferably, the pressure of the preheater 205 is maintained at a pressure in a range between 200 mbar and 2 bars, subject to the restrictions provided above, and more preferably between 200 mbar and 500 mbar. In a preferred embodiment where the pressure of the preheater is operated at a sub-atmospheric pressure, the downstream vacuum applied to the flash tank provides sufficient vacuum to maintain the sub-atmospheric pressure in the preheater.

The heated reaction mixture passes through the second pressure control device, back pressure control device (pressure control valve 213 in FIG. 2), and through the distributor 209 into the flash tank 207. The distributor 209 provides a distribution point of the reaction mixture into the flash tank 207. The flash tank 207 is maintained at a lower pressure than the preheater 205. In a preferred embodiment the flash tank 207 is operated at a temperature of between 200 and 270° C. and a pressure of between 50 to 300 mbar such that its pressure is below that of the preheater 205.

The distributor distributes the reaction mixture into the flash tank. The design and shape of the distributor can vary, but it is preferred that the distributor allows for the reaction mixture to be in a foamed state when entering the flash tank. In one embodiment the distributor comprises a cylindrical pipe disposed horizontally in the flash tank. In another embodiment the distributor comprises a cylindrical pipe element with a conical element connected to it of which the diameter decreases towards the outlet. In yet another embodiment the distributor comprises a pipe with a 'shower head' like perforated plate at the outlet. The reaction mixture is distributed through the perforated plate. In another embodiment the distributor is mounted with a slightly downward slope into the flash vessel. In yet another embodiment, a distributor comprises cylindrical or conical pipe with a perforated plate at the outlet, wherein the perforated plate is located at an angle relative to the vertical axis. Preferably the angle is between 10 and 60 degrees. An exemplary embodiment is a shower head like distributor, wherein the showerhead is mounted at a 45 degree angle from the horizontal. For a description and examples of distributors see Felix Streiff, "*Entgasen beim Herstellen und Aufbereiten von Kunststoffen*": [Tagung Neu-Ulm, 25. und 26. Nov. 1992]/*Hrsg.: Verein Deutscher Ingenieure*, VDI-*Gesellschaft Kunststofftechnik*, ISBN 3-18-234164-2, which is incorporated herein by reference.

Reactor System:

In another embodiment, the present invention provides a reactor system for producing polycarbonate. The reactor system comprises one or more reactant vessels, an oligomerization reactor, a first pressure control device, a preheater, a second pressure control device, a distributor, and a flash tank, wherein the one or more reactant vessels contain reactants comprising a melt transesterification catalyst, a dihydroxy compound, and an activated diaryl carbonate. The reactor system is connected in the following configuration:

(i) the one or more reactant vessels connected to the oligomerization reactor, (ii) the first pressure control device disposed between and connecting the outlet of the oligomerization reactor and the inlet of the preheater, (iii) the second pressure control device disposed between and connecting the outlet of the preheater and the distributor, (iv) the distributor disposed at the inlet to the flash tank.

The two pressure control devices allow the pressure in the preheater to be controlled at a pressure intermediate between the pressure in the oligomerization reactor and the flash tank during the production of polycarbonate.

Method of Preparing Polycarbonate:

In another embodiment the present invention provides a method of producing polycarbonate using the reactor system described herein. The method comprises the steps of:

(a) providing a reactor system comprising: oligomerization reactor, a first pressure control device, a preheater, a second pressure control device, a distributor, and a flash tank, wherein the reactor system is connected in the following configuration:
  (i) the first pressure control device disposed between and connecting the outlet of the oligomerization reactor and the inlet of the preheater,
  (ii) the second pressure control device disposed between and connecting the outlet of the preheater and the distributor,
  (iii) the distributor disposed at the inlet to the flash tank, (b) introducing reactants to the oligomerization reactor operating under melt polymerization conditions, the reactants comprising a melt transesterification catalyst, a dihydroxy compound, and an activated diaryl carbonate, (c) allowing the reactants to react in the oligomerization reactor to form a polycarbonate oligomer mixture comprising a polycarbonate oligomer, a byproduct phenolic compound, and unreacted reactants, (d) introducing the polycarbonate oligomer mixture to the preheater through the first pressure control device, (e) heating the polycarbonate oligomer mixture in the preheater thereby creating a heated polycarbonate oligomer mixture, (f) introducing the heated polycarbonate oligomer mixture to the flash tank through the second pressure control device to the distributor and then to the flash tank, and (g) separating and removing byproduct phenolic compound and product polycarbonate from the flash tank, wherein the first and second pressure control devices are operated to maintain a pressure in the preheater such that the polycarbonate oligomer mixture in the preheater is present in a two-phase liquid-gas state, thereby preparing polycarbonate.

The reactants may be introduced to the oligomerization reactor individually or as combined mixtures. In a preferred embodiment the reactants are introduced to the oligomerization reactor in a single mixture. The mixture may be prepared by combining the reactants as solids and then melt mixing the mixture to provide a reaction mixture. In a preferred embodiment the reaction mixture is prepared by dissolving the dihydroxy compounds in molten diaryl carbonate as described in U.S. Ser. No. 11/863,659 filed on Sep. 28, 2007, which is incorporated herein by reference for all purposes. In another embodiment the reactants are allowed to partially react to form a reaction mixture further comprising polycarbonate oligomer prior to being introduced to the oligomerization reactor. In a further embodiment, a phenolic compound such as methyl salicylate is added to the oligomerization reactor.

In one embodiment the polymer exiting the flash tank may be treated with a further polymerization step in a further polymerization/devolatilization reactor. Non limiting examples of a further reactor are another preheater/flash tank, an extruder, a wiped film evaporator, a horizontal stirred polymerizer, such as a cage reactor, a horizontal biaxial processor and the like, a wire wetting reactor, a falling strand reactor and combinations thereof. In one embodiment a stripping agent may be added to the reactor to improve the removal of the byproduct phenolic compound.

Reactants:

The Activated Diaryl Carbonate:

In a preferred embodiment of the melt production of polycarbonate, activated diaryl carbonates react with the dihydroxy compounds to form carbonate linkages. A preferred activated carbonate of the present invention is an activated diaryl carbonate such as bismethylsalicylcarbonate (BMSC). However, as used herein the term "activated diaryl carbonate" is defined as a diaryl carbonate which is more reactive than diphenyl carbonate toward transesterification reactions. Such activated diaryl carbonates are of the general formula:

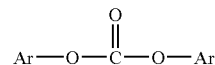

wherein Ar is a substituted aromatic radical having 6 to 30 carbon atoms. The preferred activated diaryl carbonates have the more specific general formula:

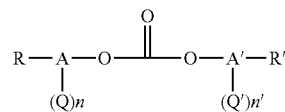

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a +a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

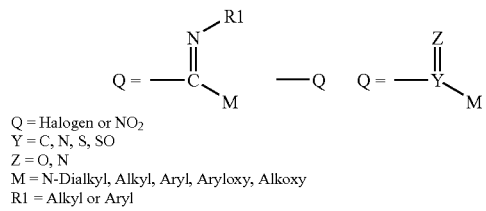

Q = Halogen or NO2
Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diaryl carbonate having the structure:

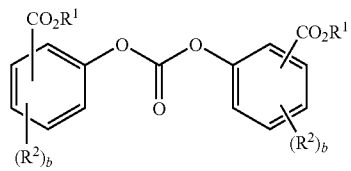

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R^1$ is preferably attached in an ortho position relative to the carbonate group.

Examples of preferred ester-substituted diaryl carbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis (benzyl salicyl)carbonate, bis(methyl 4-chlorosalicyl)carbonate and the like. Typically bis(methylsalicyl)carbonate (BMSC) is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate. Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenyl carbonate.

The theoretical stoichiometry of the reaction within the melt polymerization reaction mixture requires a molar ratio of dihydroxy composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02.

The Dihydroxy Compound:

The dihydroxy compound is not limited to aromatic dihydroxy compounds. However, such dihydroxy aromatic compounds are frequently preferred for use in these types of applications. It is contemplated that the dihydroxy compound comprises aliphatic diols and/or acids. The following is a non limiting list of such compounds:

Aliphatic Diols:

Isosorbide: 1,4:3,6-dianhydro-D-sorbitol, Tricyclodecanedimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid,1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprises a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

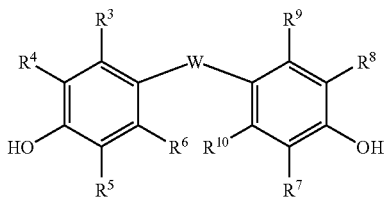

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

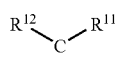

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure

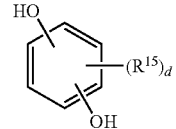

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

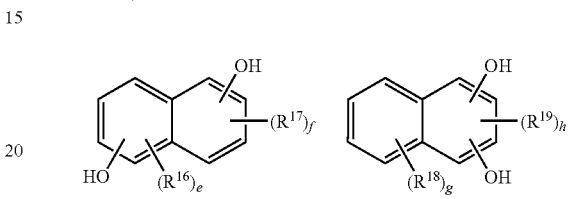

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis (4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4- hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of BPA and other comonomers are selected based on the desired composition of the oligomers. If other comonomers are used, they can be added as part of the same feed, in a separate feed, or both.

The Phenolic Compound

As a melt reaction proceeds using an activated diaryl carbonate and dihydroxy compound to form polycarbonate, the activated diaryl carbonate is consumed and a phenolic byproduct is generated. The phenolic byproduct is typically removed from reaction system to drive the polymerization reaction toward higher conversion. In one embodiment phenolic compound is added to form the reaction mixture to reduce the tendency of the reactants to react prior to their introduction into the oligomerization reactor. The structure of the phenolic byproduct will depend on what diaryl carbonate is employed as the carbonate source and thus can be an ester-substituted phenol or a non-ester-substituted phenol. For example, if bismethylsalicylcarbonate (BMSC) is employed, a typical phenolic byproduct will be an ester-substituted phenol such as methyl salicylate. Non-limiting examples of other suitable phenolic compounds are found in U.S. application Ser. No. 11/275,110 filed on Dec. 12, 2005 which is incorporated herein by reference for all purposes.

The Melt Transesterification Catalyst:

In one embodiment the invention provides a method of producing polycarbonate. In this embodiment a melt transesterification catalyst (or catalyst system) will be added to the oligomerization reactor. The catalyst system used in this method of the present invention comprises a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The quaternary ammonium compound is selected from the group of organic ammonium compounds having structure,

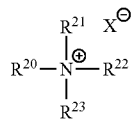

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

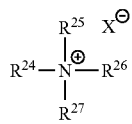

wherein $R^{24}$-$R^{27}$ are independently a $C_1$-$C_{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred. Further sodium hydroxide is often contained within the reaction components as an impurity and is contained in such an amount to catalyze the reaction without the addition of additional catalysts.

In order to achieve the formation of polycarbonate using the method of the present invention an effective amount of catalyst must be employed. The amount of catalyst employed is typically based upon the total number of moles of dihydroxy compounds employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1 \times 10^{-2}$ and $1 \times 10^{-6}$, preferably between $1 \times 10^{-4}$ and $1 \times 10^{-5}$ moles per mole of the first and second dihydroxy compounds combined. The inorganic metal hydroxide catalyst typically will be used in an amount corresponding to between $1 \times 10^{-4}$ and $1 \times 10^{-8}$, preferably $1 \times 10^{-4}$ and $1 \times 10^{-7}$ moles of metal hydroxide per mole of the first and second dihydroxy compounds combined.

In a third catalyst system according to the method of the present invention, solely a alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

EXAMPLES

Having described the invention in detail, the following examples are provided. The examples should not be considered as limiting the scope of the invention, but merely as illustrative and representative thereof.

Molecular weight: Mw and Mn were measured by GPC analysis of 1 mg/ml polymer solutions in methylene chloride versus polystyrene standards.)

1. Examples 1-8

In the traditional melt polymerization process the residence time in a continuously stirred tank reactor (CSTR) to obtain an oligomer containing 35-50 wt % of methyl salicylate (MS) is about 1 to 2 hours at temperatures of about 160 to 200° C. Table 1 shows the conversion in a plug flow reactor (PFR) as a function of the process conditions.

Figure 3:
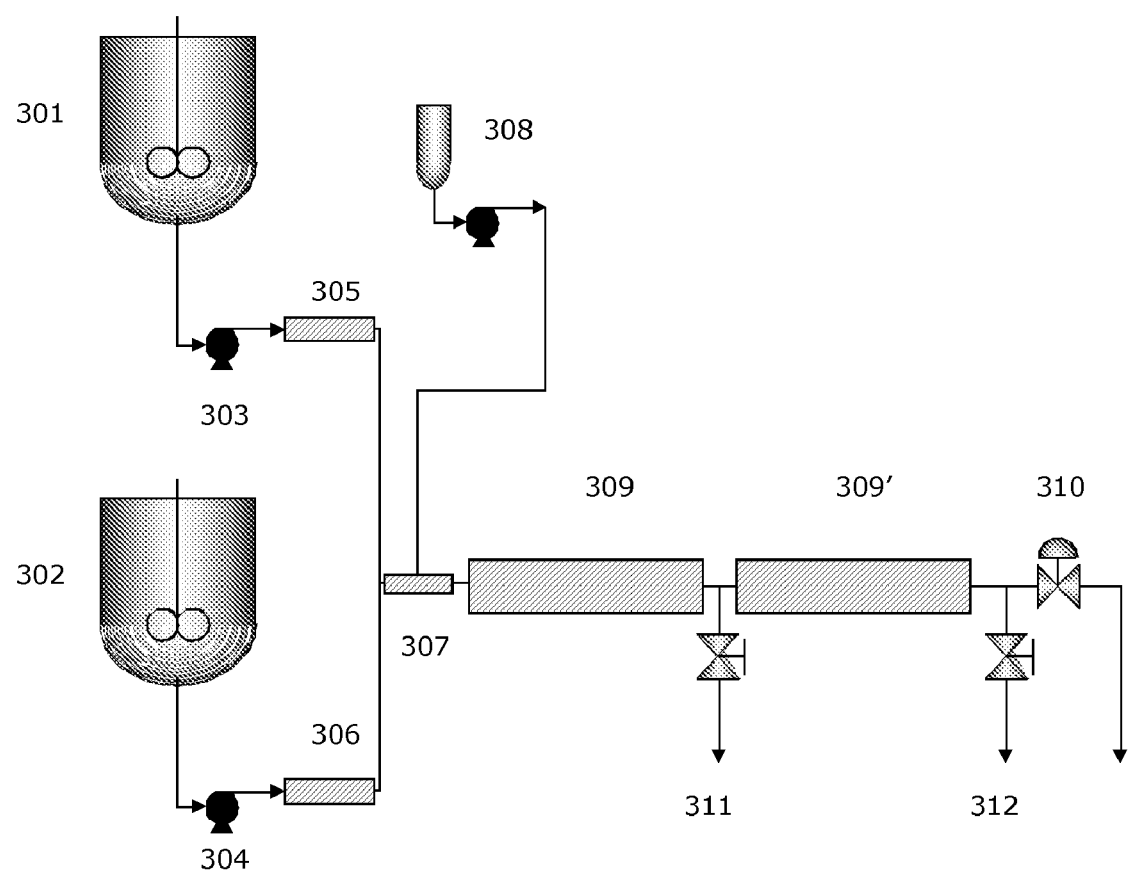
FIG. 3 is a schematic view of a reactor system used in the example section.

Conditions:

In these examples bismethylsalicylcarbonate (BMSC) and BPA monomers were melted separately and mixed as described in FIG. 3. BPA and BMSC were passed from vessels 301, 302 through hot oil heated feed preheaters 305 and 306 to ensure a well defined process temperature at the dosing section 307 and hence at the inlet of plug flow reactor 309. Positive displacement pumps 303 and 304 were used in order to enable a steady predefined flow rate of the monomer mixture. A catalyst solution was added either to the BPA batch 301 or to the dosing section by means of an HPLC pump 308. The dosing section comprised a static mixer to ensure proper mixing of catalyst and the monomer mixture. The plug flow reactor consisted of a segment of 3 meters and a segment of 2 meters of hot oil jacketed Sulzer SMXL® static mixers with an internal diameter of 20 mm. The internal volume of the plug flow reactor was 1.66 liter, corresponding to a residence time of 10 minutes at a feed rate of 10 liters/hour. Downstream of the reactor the oligomer was passed through back-pressure control valve 310 that served to maintain a sufficiently high pressure inside the plug flow reactor to avoid significant evaporation of methyl salicylate. This was a requirement to ensure proper functioning of the plug flow reactor and typically the pressure inside the plug flow reactor was 2 to 5 bar(g) at temperatures between 170 and 230° C. The residence time in the reactor section was varied between 3 and 15 minutes, which corresponds to a throughput of 34.8-6.7 kg/h.

Results:

TABLE 1

Examples 1-8: MS content [w %] in oligomer samples as a function of temperature/residence time; Equilibrium [MS] = 51.8 w %
(NOTE: Alpha Catalyst: = NaOH, Beta Catalyst: = TMAH)

| Example number | Reaction temperature | 3 | 5 | 6 | 8 | 9 | 10 | 15 | Remarks |
|---|---|---|---|---|---|---|---|---|---|
| 1 | 230° C. | 40.4 | 41.3 | 46.85 | | | 50.75 | | Catalyst α + β 2/25 µeq |
| 2 | 200° C. | 37.25 | 42.35 | 41.5 | | 44.9 | 46.15 | 48.9 | dissolved in the |
| 3 | 185° C. | | | 32.3 | | 36.3 | 38.2 | 40.4 | BPA batch |
| 4 | 170° C. | | 24.5 | 2.8 | 32.5 | 31.6 | 33.4 | 35.9 | |
| 5 | 200° C. | | | 4.7 | | | 9.7 | | without catalyst |
| 6 | 200° C. | | | 25.1 | | | 32.9 | | Catalyst α + β 2/25 µeq added with pump (308) |
| 7 | 200° C. | | | 44.7 | | | 49.2 | | Catalyst α + β 4/50 µeq added with pump (308) |
| 8 | 200° C. | | | 28.6 | | | 31.6 | | 25 µeq β-catalyst added with pump (308) |

Examples 1-8 demonstrate that the residence time in the PFR required for similar conversion as an oligomerization CSTR is about 80 to 90% smaller than that of the CSTR.

2. Examples 9-29

Figure 4:
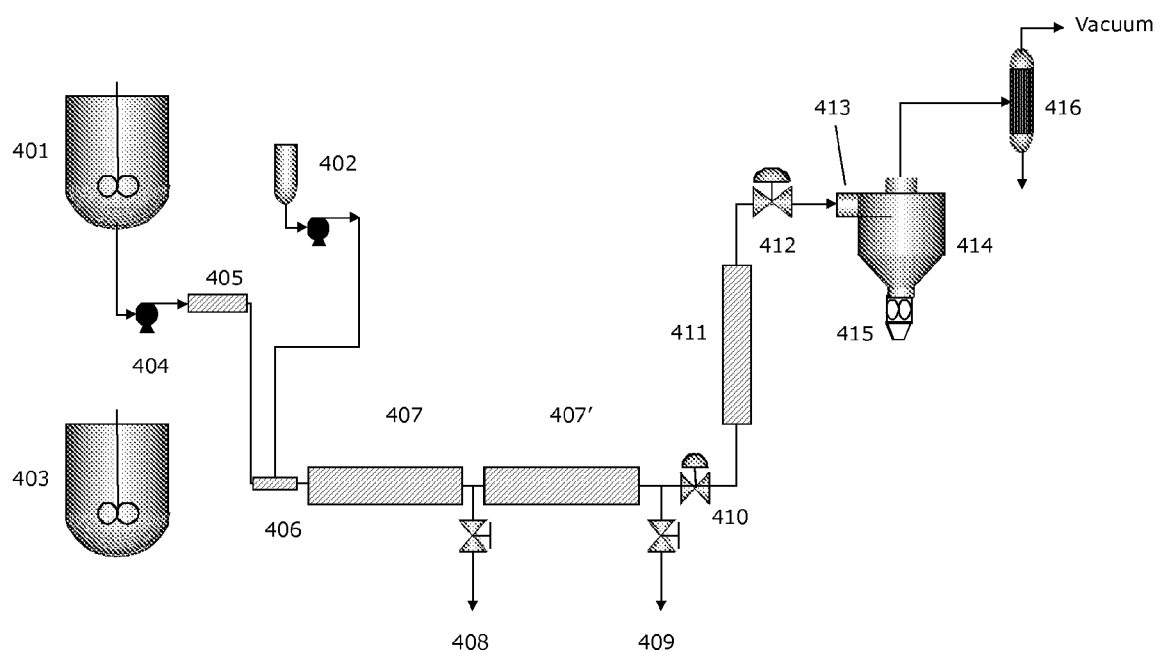
FIG. 4 is a schematic view of a reactor system used in the example section.

Examples 9-29 were carried out using the reactor system demonstrated in FIG. 4. The components of the reactor system were supplied by Sulzer Chemtech Ltd and are as follows:
401: Feed vessel
402: HPLC catalyst pump
403: Melting vessel
404: Piston pump
405: Preheater reactor
406: Dosing+SMX mixer section
407, 407': SMXL®-Reactor (2+3 meters)
408, 409: Drain valves
410: Membrane back pressure valve
411: Preheater devol (SMXL®)
412: Membrane back pressure valve
413: Distributor
414: Devolatilization vessel
415: Gear pump and die head
416: Condenser Operation:

Formulation Tank:

Liquid BMSC is added to a stirred formulation vessel (403) and kept at about 160° C. while the other monomer(s) and, optionally, chainstopper are added to obtain a clear solution with a molar ratio of 1.02 mole BMSC per mole dihydroxy (e.g. BPA). The clear solution is allowed to cool down to 130° C. and is charged into vessel (401). Once the formulation vessel is empty a new batch is prepared.

Plug Flow Reactor Section:

The monomer mixture is passed from vessel (401) through hot oil heated feed preheater (405) to ensure a well defined process temperature at the dosing section (406) and hence at the inlet of plug flow reactor (407, 407'). Positive displacement pumps (404) is used in order to enable a steady predefined flow rate of the monomer mixture. A catalyst solution is added to the dosing section by means of an HPLC pump (402). The dosing section typically comprises a static mixer to ensure proper mixing of catalyst and the monomer mixture.

The plug flow reactor is preferably operated in a vertical fashion with reactant flow from bottom to top. The plug flow reactor consisted of a segment of 3 meters (407) and a segment of 2 meters (407') of hot oil jacketed Sulzer SMXL® static mixers with an internal diameter of 20 mm. The internal volume of the plug flow reactor was 1.66 liter, corresponding to a residence time of 10 minutes at a feed rate of 10 liters/ hour.

Downstream of the reactor the oligomer was passed through backpressure control valve (410) that served to maintain a sufficiently high pressure inside the plug flow reactor to avoid significant evaporation of methyl salicylate. This is a requirement to maintain a single flow regime inside the plug flow reactor that ensures proper functioning of the reactor.

Typically the pressure inside the plug flow reactor was 2 to 5 bar(g) at temperatures between 170 and 230° C. The residence time in the reactor section is typically between 3 and 15 minutes, which corresponds to a throughput of 34.8-7 kg/h for the system tested.

Flash Devolatilization Section:

From back pressure control valve (410) the oligomer is passed through preheater (411) comprising a hot oil jacketed heat exchanger containing static mixer elements to ensure uniform heating of the oligomer. The preheater is disposed vertically and operated such that the reactants flow in upflow mode. The heat exchanger is operated under vacuum of 200-500 mbar(a) in a co-current way and typical hot oil inlet temperatures range from 230 to 250° C.

After preheating, the mixture is introduced over valve (412) into the distributor (413) inside devolatilization vessel (414). The distributor comprises a horizontal pipe with a perforated plate at the end and is disposed into the side of the flash vessel. Operating temperatures range from 200 to 270° C. Methyl salicylate vapor is removed from the vessel by means of a vacuum unit, and condensed against cooling water in a condenser (416). Typical operating pressures are in the range of 50 to 300 mbar. Polymer formed after removal of the bulk of methyl salicylate is removed from the vessel by means of a gear pump (415) mounted directly to the cone shaped bottom section of the vessel. A hot oil heated die is mounted to the discharge side of the pump in order to create a continuous strand of polymer melt.

In examples 9-30 the design of the reactor system was modified to enable operation of the preheater under vacuum in order to effect partial evaporation of MS inside the preheater. In the modified process the bulk energy input takes place at relatively low temperatures, i.e., close to the boiling point of methyl salicylate at sub-atmospheric pressure. Hence the undesirable combination of having a high concentration of MS in the oligomer at a high temperature is avoided. Another advantage of partial evaporation inside the preheater is the reduced adiabatic temperature drop when flashing off a smaller amount of MS in the devol vessel as compared to the standard situation where all evaporation would take place inside the devol vessel. The reduced adiabatic temperature drop allows exploring process conditions that lead to polymers with higher viscosities while limiting the risk of solids formation compared to the standard situation.

Figure 10A:
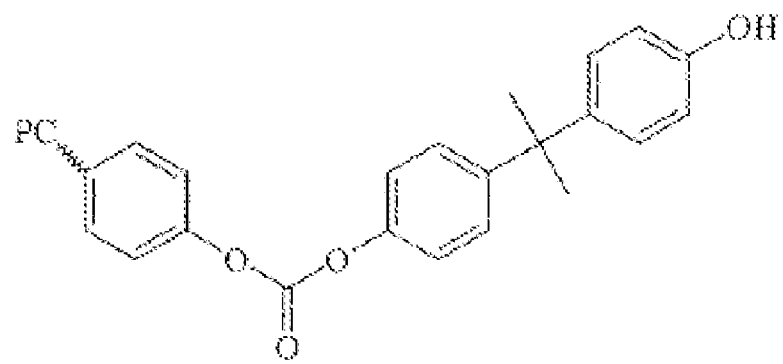
FIGS. 10A-10F are chemical structures.
Figure 10B:
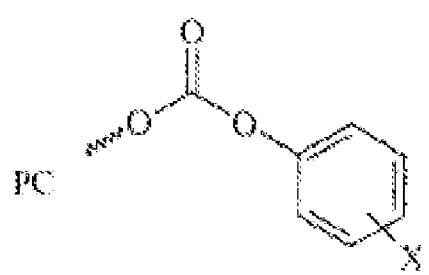
Figure 10C:
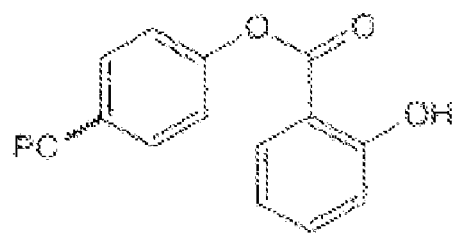
Figure 10D:
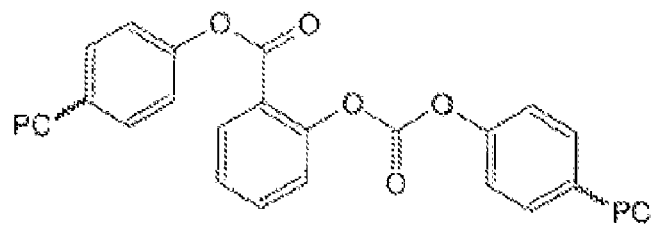
Figure 10E:
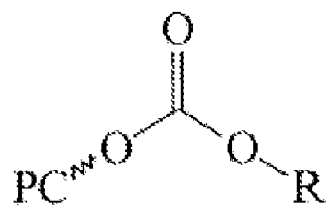
Figure 10F:
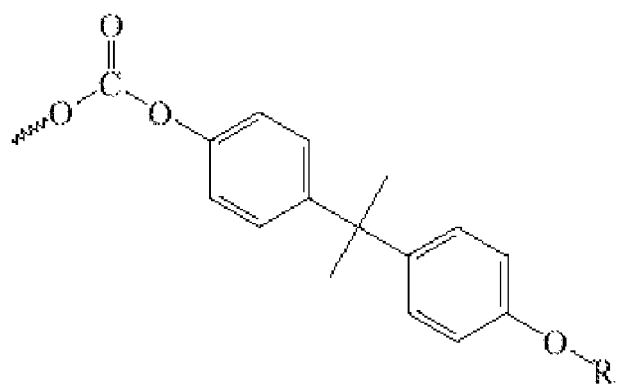

Results:

The data regarding process conditions and results of Example 9-30 are provided below in Table 2. Graphical interpretations of the results are found in FIGS. 5-8. Chemical structures can be found in FIGS. 10A-10B.

TABLE 2

| Example# | Feed kg/h | P devol mbar | Cat | PFR Temp °C. | P preheat mbar | SP T preheat °C. | SP T devol °C. | Residual MS w % | Color L | a | o | Mw PC | Mn PC | PD |
|---|---|---|---|---|---|---|---|---|---|---|---|---|---|---|
| 9 | 10 | 100 | 2X | 200 | 475 | 250 | 240 | 2.2 | 75.5 | 1.9 | 8.4 | 19047 | 8804 | 2.16 |
| 10 | 10 | 200 | 2X | 200 | 475 | 250 | 240 | 4.3 | 84.8 | 2.8 | 10.1 | 15239 | 7218 | 2.11 |
| 11 | 10 | 50 | 2X | 200 | 475 | 250 | 240 | 1.2 | 85.8 | 2.1 | 10.1 | 21077 | 9639 | 2.19 |
| 12 | 15 | 50 | 2X | 200 | 475 | 250 | 240 | 1.0 | 86.9 | 1.4 | 9.0 | 24314 | 10917 | 2.23 |
| 13 | 20 | 50 | 2X | 200 | 475 | 250 | 240 | 1.4 | 89.8 | 0.9 | 8.2 | 22354 | 10188 | 2.20 |
| 14 | 20 | 50 | 1X | 200 | 475 | 250 | 240 | 1.5 | 90.2 | 1.0 | 8.1 | 21577 | 9895 | 2.18 |
| 15 | 30 | 50 | 2X | 200 | 475 | 250 | 240 | 1 | 91.2 | 0.1 | 7.6 | 21389 | 9869 | 2.17 |
| 16 | 10 | 300 | 2X | 200 | 475 | 250 | 270 | 3.1 | 88.0 | 2.1 | 11.4 | 15017 | 7064 | 2.13 |
| 17 | 10 | 50 | 2X | 200 | 475 | 250 | 270 | 0.5 | 87.0 | 2.3 | 13.0 | 23010 | 10362 | 2.22 |
| 18 | 20 | 50 | 2X | 200 | 475 | 250 | 270 | 0.6 | 88.7 | 1.1 | 10.8 | 22559 | 10328 | 2.18 |
| 19 | 30 | 50 | 2X | 200 | 475 | 250 | 270 | 0.7 | 90.3 | 0.6 | 8.9 | 21042 | 9712 | 2.17 |
| 20 | 30 | 50 | 1X | 200 | 475 | 250 | 270 | 0.8 | 90.5 | 0.5 | 9.4 | 22233 | 10222 | 2.18 |
| 21 | 10 | 50 | 2X | 200 | 200 | 250 | 240 | 1.2 | 89.8 | 1.1 | 10.1 | 23558 | 10626 | 2.22 |
| 22 | 20 | 50 | 2X | 200 | 200 | 250 | 240 | 1 | 91.4 | 0.2 | 8.0 | 22453 | 10240 | 2.19 |
| 23 | 20 | 50 | 2X | 200 | 200 | 250 | 225 | 1.3 | 91.9 | 0.0 | 6.7 | 21830 | 10014 | 2.18 |
| 24 | 20 | 50 | 2X | 200 | 200 | 250 | 215 | 1.6 | 92.4 | 0.0 | 6.0 | 21051 | 9682 | 2.17 |
| 25 | 30 | 50 | 2X | 200 | 200 | 250 | 215 | 2.1 | 91.9 | −0.2 | 5.7 | 20929 | 9643 | 2.17 |
| 26 | 20 | 50 | 2X | 170 | 200 | 250 | 215 | 1.6 | 92.4 | −0.1 | 5.8 | 20509 | 9520 | 2.15 |
| 27 | 10 | 218 | 2X | 170 | 200 | 250 | 222 | 1.8 | 90.4 | −0.2 | 5.9 | 19919 | 9279 | 2.15 |
| 28 | 10 | 100 | 2X | 170 | 200 | 230 | 200 | 5.4 | 90.7 | 0.6 | 6.4 | 16988 | 8036 | 2.11 |
| 29 | 20 | 100 | 2X | 170 | 200 | 230 | 200 | 6.5 | would not strand | | | 15708 | 7547 | 2.08 |

| Example# | Salicyl OH ppm | TMSC mol % | IMSC mol % | Methyl Carbonate mol % | Methyl Ether mol % | BPA OH w % | ppm branched Tries |
|---|---|---|---|---|---|---|---|
| 9 | 89 | 3.84 | 0.25 | 0.18 | 0.05 | 676 | <200 |
| 10 | 192 | 4.61 | 0.25 | 0.31 | 0.05 | 1165 | <200 |
| 11 | 74 | 3.60 | 0.29 | 0.14 | 0.05 | 383 | <200 |
| 12 | 57 | 3.15 | 0.21 | 0.08 | 0.05 | 406 | <200 |
| 13 | 57 | 3.38 | 0.15 | 0.06 | 0.05 | 501 | <200 |
| 14 | 46 | 3.66 | 0.14 | 0.05 | 0.05 | 488 | <200 |
| 15 | 28 | 4.02 | 0.13 | 0.05 | 0.05 | 313 | <200 |
| 16 | 291 | 4.44 | 0.50 | 0.75 | 0.05 | 974 | <200 |
| 17 | 60 | 3.42 | 0.51 | 0.31 | 0.05 | 239 | <200 |
| 18 | 36 | 3.67 | 0.25 | 0.13 | 0.05 | 263 | <200 |
| 19 | 31 | 4.10 | 0.20 | 0.10 | 0.05 | 277 | <200 |
| 20 | 17 | 4.03 | 0.19 | 0.08 | 0.05 | 144 | <200 |
| 21 | 75 | 3.15 | 0.29 | 0.17 | 0.05 | 393 | <200 |
| 22 | 38 | 3.61 | 0.16 | 0.07 | 0.05 | 364 | <200 |
| 23 | 36 | 3.74 | 0.12 | 0.05 | 0.05 | 383 | <200 |
| 24 | 37 | 3.96 | 0.12 | 0.05 | 0.05 | 417 | <200 |
| 25 | 43 | 4.07 | 0.10 | 0.05 | 0.05 | 528 | <200 |
| 26 | 27 | 4.09 | 0.10 | 0.05 | 0.05 | 406 | <200 |
| 27 | 29 | 4.17 | 0.10 | 0.06 | 0.05 | 469 | <200 |
| 28 | 50 | 3.63 | 0.05 | 0.05 | 0.05 | 1420 | <200 |
| 29 | 47 | 4.58 | 0.05 | 0.05 | 0.05 | 1278 | <200 |

Cat 1X means 2 mEq NaOH 25 mEq TMAH
Cat 2X means 4 mEq NaOH 50 mEq TMAH

Figure 5:
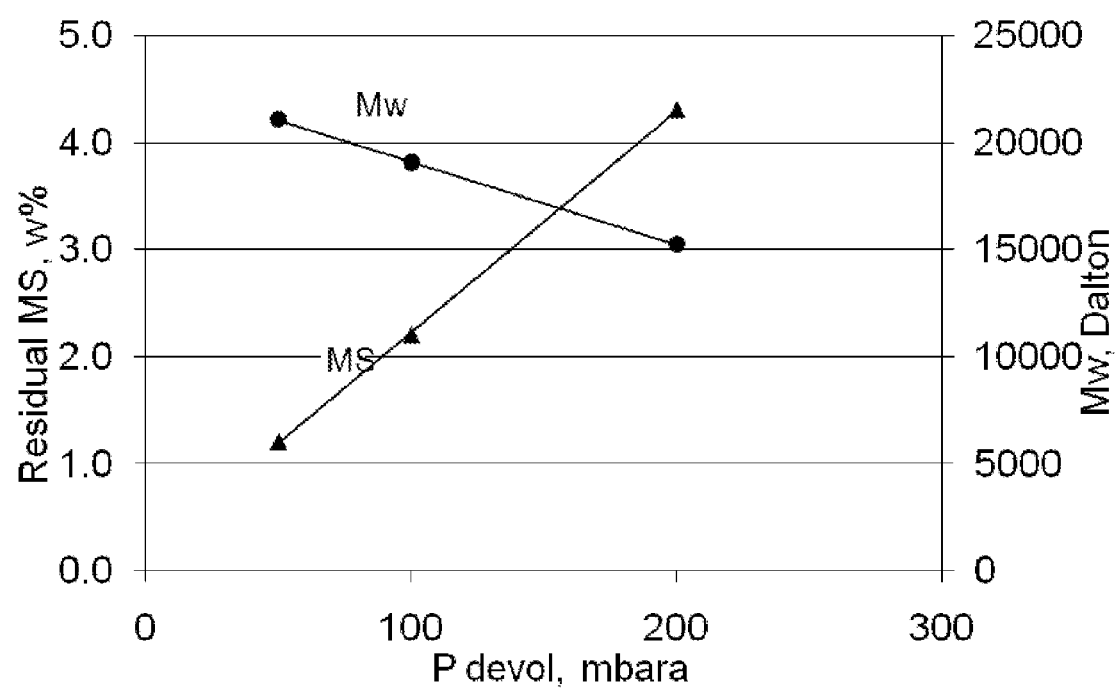
FIG. 5 is a graphical representation of results from the example section.

FIG. 5 shows the correlation between the concentration of residual MS and molecular weight as a function of the pressure in the devolatilization vessel at a constant temperature and at constant throughput. In addition, by controlling pressure in the devol vessel molecular weight and residual MS levels can be accurately controlled.

Figure 6:
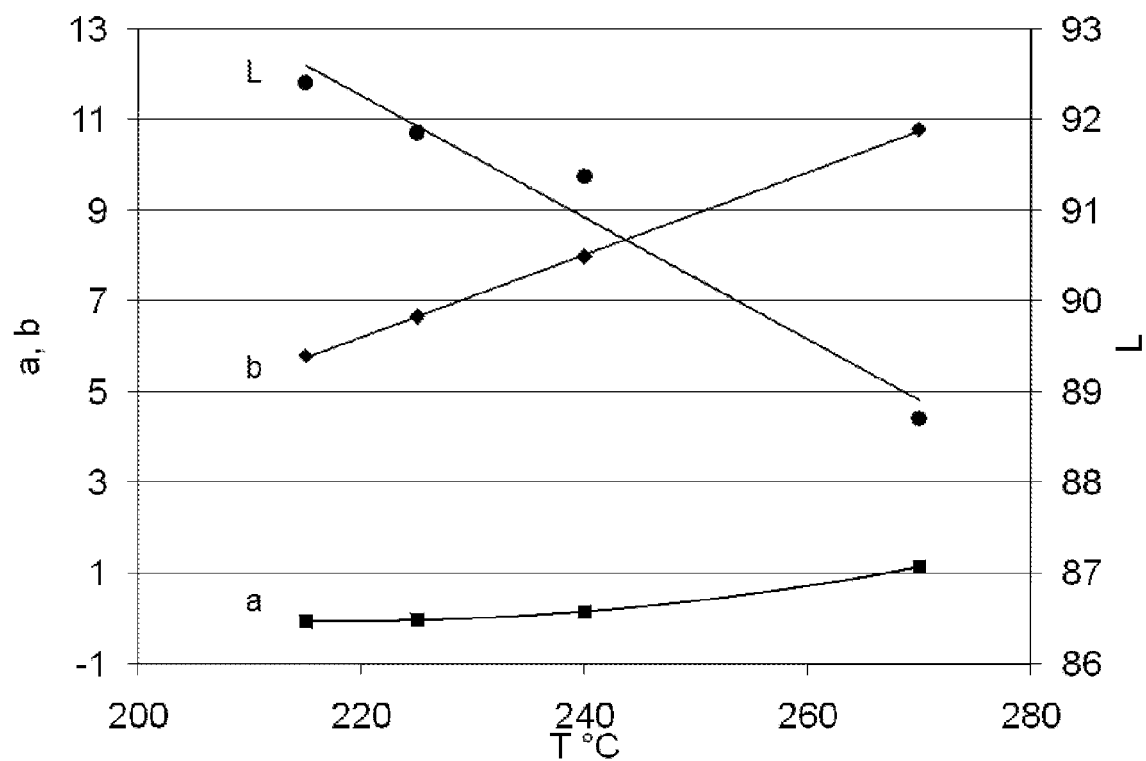
FIG. 6 is a graphical representation of results from the example section.

FIG. 6 demonstrates the benefit on product color of running the flash devol step at as low temperatures as possible. The effect of temperature on b color is most pronounced. At the lowest temperature tested the pellets have a good color as demonstrated by a negative a-value, a b-value of 6 and an L-value of 92.

Figure 7:
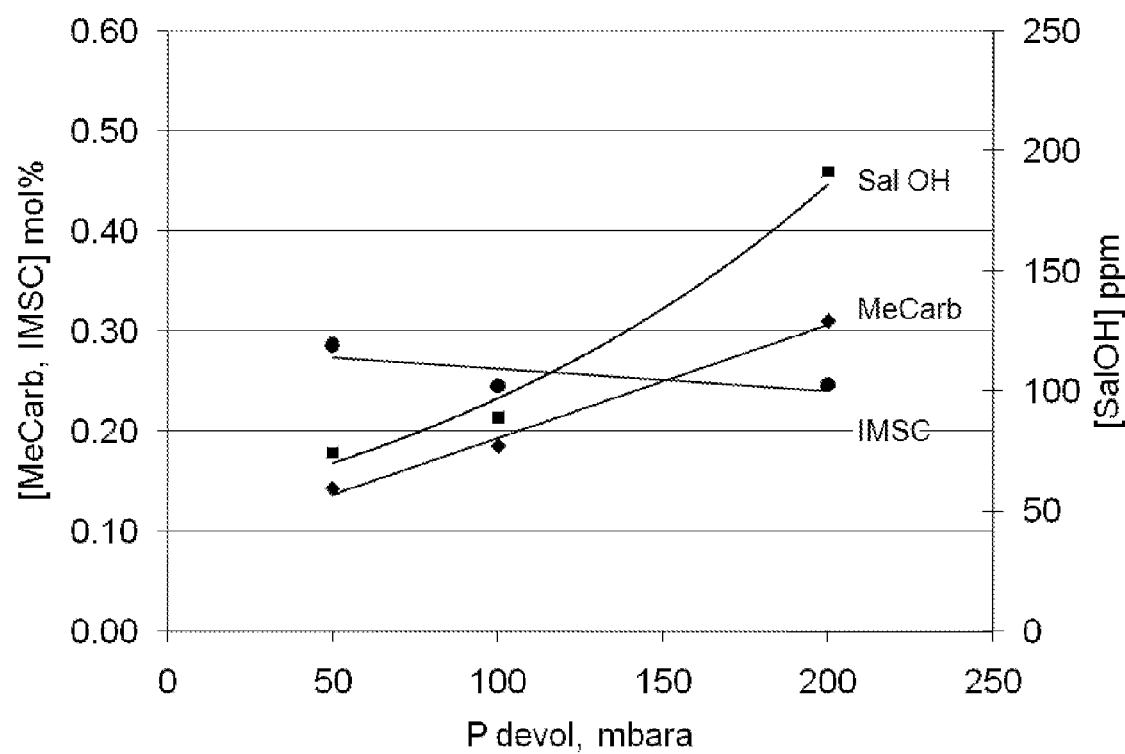
FIG. 7 is a graphical representation of results from the example section.

FIG. 7 shows the benefit of lower pressure, and hence, lower % MS on byproduct formation. The increase of SalOH and MeCarb with pressure can be explained keeping in mind the effect of p(devol) on % MS as shown in FIG. 3, and the mechanism of SalOH and MeCarb formation: a higher MS concentration favors SalOH formation which in turn increases MeCarb formation.

Figure 8:
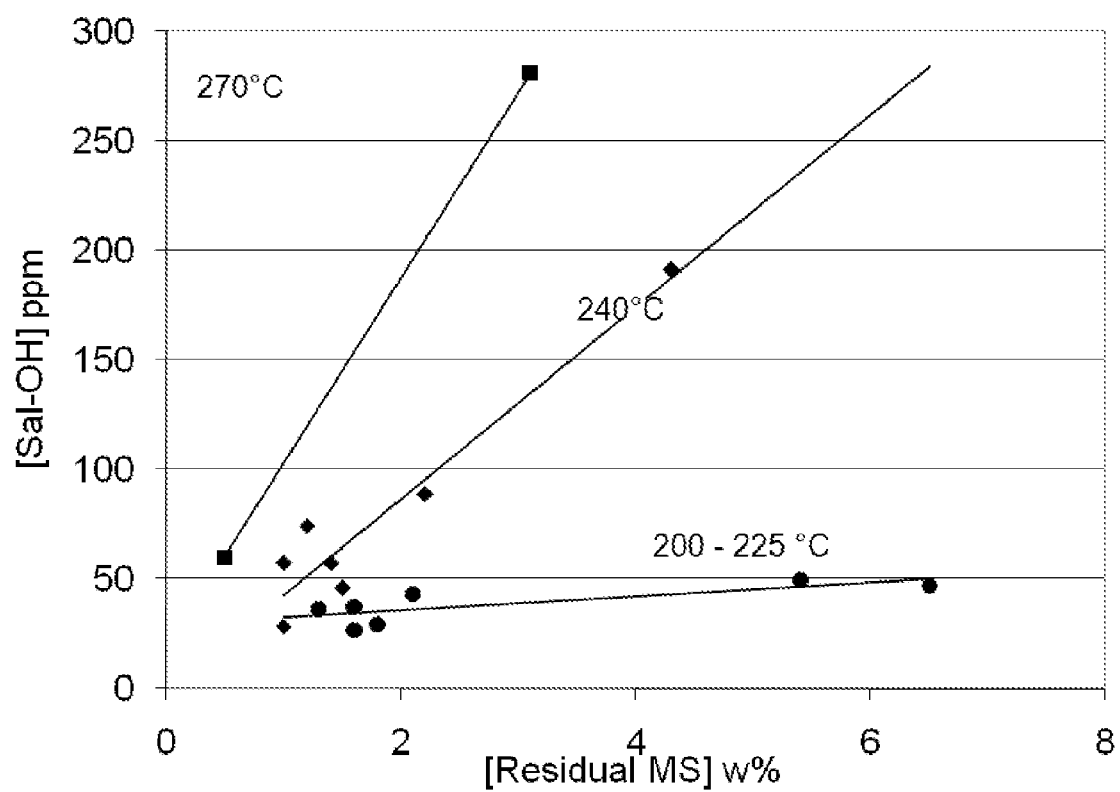
FIG. 8 is a graphical representation of results from the example section.

The need for both a low temperature and low % MS is shown in FIG. 8. The effect of % MS on formation of Salicyl-OH byproduct at 215° C. is not as pronounced as that at 240° C.

3. Example 30

A BPA polycarbonate prepolymer was produced in the process depicted in FIG. 4 according to the conditions of example 25. The melt strands exiting die head 415 were passed through a cooling bath and pelletized. The pellets were then transferred to a solids feed hopper, from which they were fed volumetrically into the first barrel of a devolatilizing ZSK25 co-rotating twinscrew extruder with a LID of about 59. Vacuum levels in the extruder varied between atmosperic in the feed barrel to about 1-10 mbar(a) in the vent ports closer to the die head. The polymer product was extruded through a die and the melt strands were cooled in a water bath and pelletized. In the extruder the polymerization process was essentially completed. Results are listed in Table 3.

TABLE 3 results of Example 30.

| Screw speed | min-1 | 300 | 400 |
|---|---|---|---|
| Feed rate | kg/hr | 9.8 | 16.2 |
| Mw | g/mol | 31900 | 31400 |
| MS in feed | w % | 1.3 | 1.3 |
| Residual MS | ppm by weight | 113 | 571 |
| Internal salicyl carbonate: | mol % | 0.32 | 0.33 |
| Methyl carbonate: | mol % | 0.11 | 0.15 |
| Methyl ether: | mol % | <0.05 | <0.05 |
| Salicyl-OH | ppm by weight | <5 | <5 |

4. Comparative Example 1

Figure 9:
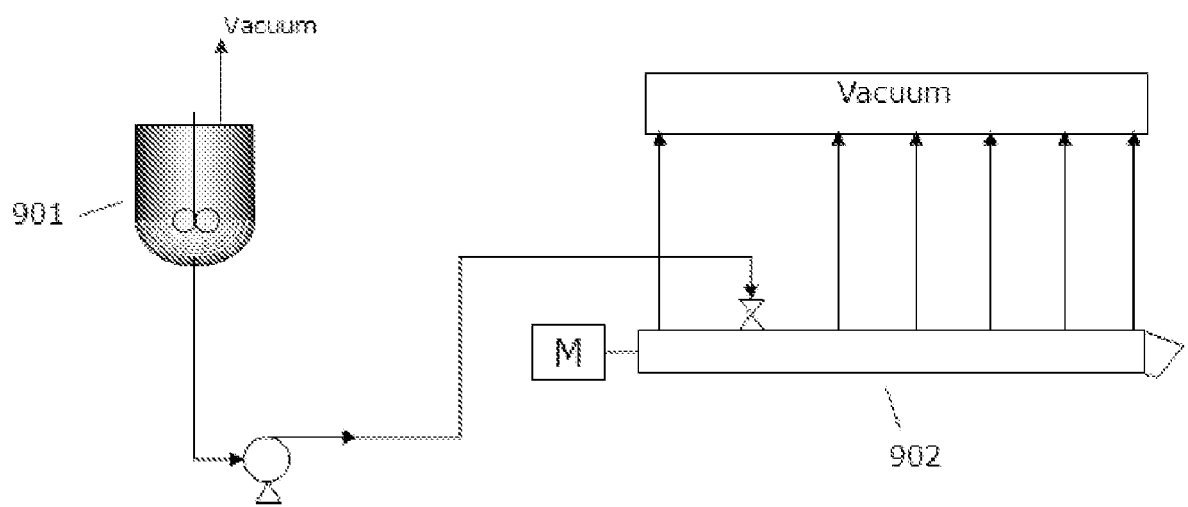
FIG. 9 is a schematic view of a reactor system used in the example section.

A BPA polycarbonate polymer was made in a process according to FIG. 9. An equilibrated oligomer was formed in a batch reactor 901. The molar ratio BMSC/BPA was 1.025. NaOH was added in a ratio of 2.0 10−6 moles per mole of BPA, and TMAH was added in a ratio of 2.5 10−5 moles per mole of BPA. The temperature in reactor 901 was kept at about 190° C. and the pressure was essentially atmospheric.

The equilibrated oligomer was fed into the second barrel of a devolatilizing ZSK25 co-rotating twinscrew extruder with a LID of about 59, and fitted with a back-vent as well as with forward vent ports. Vacuum levels in the extruder vent ports varied between about 10 to 100 mbar(a) in the back-vent and between about 1 and 5 mbar(a) in the vent ports closer to the die head. The polymer product was extruded through a die and the melt strands were cooled in a water bath and pelletized. In the extruder the polymerization process was essentially completed. The results are listed in table 4.

TABLE 4 results of Comparative example 1.

| Screw speed | min-1 | 300 |
|---|---|---|
| Feed rate | kg/hr | 14.5 |
| Mw | g/mol | 31088 |
| MS in feed | w % | 52 |
| Residual MS | ppm by weight | 134 |
| Internal salicyl carbonate: | mol % | 0.97 |
| Methyl carbonate: | mol % | 0.64 |
| Methyl ether: | mol % | 0.10 |
| Salicyl-OH | ppm by weight | 6 |

Comparing Tables 3 and 4 shows that the concentrations of internal salicyl carbonate and methyl carbonate in the latter are significantly higher.

5. Comparative Example 2

An equilibrated BPA polycarbonate oligomer was made according to the method described in Comparative Example 1. The equilibrated oligomer was devolatilized by increasing the temperature in the batch reactor to about 200° C. and adjusting the pressure accordingly in order to remove about 75% of the methyl salicylate present in the equilibrated oligomer. The resulting prepolymer was fed into the second barrel of a devolatilizing ZSK25 co-rotating twinscrew extruder with a LID of about 59 as described in Comparative Example 1. The results are listed in table 5.

TABLE 5 results of Comparative example 2.

| Screw speed | min-1 | 300 | 400 |
|---|---|---|---|
| Feed rate | kg/hr | 10.6 | 14.4 |
| Mw | g/mol | 31666 | 31414 |
| MS in feed | w % | 25 | 25 |
| Residual MS | ppm by weight | 251 | 364 |
| Internal salicyl carbonate: | mol % | 1.53 | 1.45 |
| Methyl carbonate: | mol % | 0.82 | 0.78 |
| Methyl ether: | mol % | 0.19 | 0.18 |
| Salicyl-OH | ppm by weight | 16 | 21 |

Comparing table 3 and table 5 shows that the concentrations of byproducts in the latter are significantly higher.

The invention claimed is:

1. A reactor system for producing polycarbonate, the reactor system comprising one or more reactant vessels, an oligomerization reactor, a first pressure control device, a preheater, a second pressure control device, a distributor, and a flash tank, wherein the one or more reactant vessels contain reactants comprising a melt transesterification catalyst, a dihydroxy compound, and an activated diaryl carbonate, wherein the reactor system is connected in the following configuration:

(i) the one or more reactant vessels connected to the oligomerization reactor, (ii) the first pressure control device disposed between and connecting the outlet of the oligomerization reactor and the inlet of the preheater, (iii) the second pressure control device disposed between and connecting the outlet of the preheater and the distributor, (iv) the distributor disposed at the inlet to the flash tank, whereby the pressure in the preheater is controllable at a pressure intermediate between the pressure in the oligomerization reactor and the flash tank.

2. The reactor system of claim 1, wherein the activated diaryl carbonate comprises BMSC.

3. The reactor system of claim 1, wherein the first pressure control device is a back pressure control valve and the second pressure control device is a back pressure control valve.

4. The reactor system of claim 1, wherein the oligomerization reactor is a plug flow reactor.

5. A method of producing polycarbonate, the method comprising,
   (a) providing a reactor system comprising: an oligomerization reactor, a first pressure control device, a preheater, a second pressure control device, a distributor, and a flash tank, wherein the reactor system is connected in the following configuration:
      (i) the first pressure control device disposed between and connecting the outlet of the oligomerization reactor and the inlet of the preheater,
      (ii) the second pressure control device disposed between and connecting the outlet of the preheater and the distributor,
      (iii) the distributor disposed at the inlet to the flash tank,
   (b) introducing reactants to the oligomerization reactor operating under melt polymerization conditions, the reactants comprising a melt transesterification catalyst, a dihydroxy compound, and an activated diaryl carbonate,
   (c) allowing the reactants to react in the oligomerization reactor to form a polycarbonate oligomer mixture comprising a polycarbonate oligomer, a byproduct phenolic compound, and unreacted reactants,
   (d) introducing the polycarbonate oligomer mixture to the preheater through the first pressure control device,
   (e) heating the polycarbonate oligomer mixture in the preheater thereby creating a heated polycarbonate oligomer mixture,
   (f) introducing the heated polycarbonate oligomer mixture to the flash tank through the second pressure control device to the distributor and then to the flash tank, and
   (g) separating and removing byproduct phenolic compound and product polycarbonate from the flash tank,
   wherein the first and second pressure control devices are operated to maintain a pressure in the preheater such that the polycarbonate oligomer mixture in the preheater is present in a two-phase liquid-gas state,
   thereby preparing polycarbonate.

6. The method of claim 5, wherein the oligomerization reactor is maintained at a temperature between 170 and 230° C. inclusive.

7. The method of claim 6, wherein the first pressure control device is operated to maintain a pressure in the oligomerization reactor of between 2 and 5 bar inclusive.

8. The method of claim 5, wherein the preheater is operated at a temperature in a range between 230 and 260° C. inclusive.

9. The method of claim 8, wherein the preheater is operated at a temperature in a range between 230 and 250° C. inclusive.

10. The method of claim 8, wherein the second pressure control device is operated to maintain a pressure in the preheater in a range between 200 mbar and 2 bar inclusive.

11. The method of claim 10, wherein the second pressure control device is operated to maintain a pressure in the preheater in a range between 200 mbar and 500 mbar inclusive.

12. The method of claim 5, wherein the activated diaryl carbonate is BMSC and the byproduct phenolic compound is methyl salicylate.

13. The method of claim 5, wherein the first pressure control device is a back pressure control valve and the second pressure control device is a back pressure control valve.

14. The method of claim 5, wherein the oligomerization reactor is a plug flow reactor.

15. The method of claim 14, wherein the first pressure control device is operated to maintain a pressure in the oligomerization reactor such that the polycarbonate oligomer mixture in the plug flow reactor is in a single-phase liquid state.

16. The method of claim 5, wherein the reactants introduced to the oligomerization reactor further comprise a phenolic compound.

17. The method of claim 16, wherein the reactants introduced to the oligomerization reactor further comprise polycarbonate oligomer.

\* \* \* \* \*